United States Patent
Holm et al.

(10) Patent No.: US 6,687,255 B1
(45) Date of Patent: Feb. 3, 2004

(54) DATA COMMUNICATION CIRCUIT HAVING FIFO BUFFER WITH FRAME-IN-FIFO GENERATOR

(75) Inventors: Jeffrey J. Holm, Eden Prairie, MN (US); Jeffrey A. Barber, New Brighton, MN (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/532,146

(22) Filed: Mar. 21, 2000

(51) Int. Cl.[7] .............................................. H04L 12/28
(52) U.S. Cl. ......................................... 370/412; 710/33
(58) Field of Search ................................. 370/412, 413, 370/378, 379, 381, 382, 383, 395.41, 395.7, 429, 510, 509, 230, 230.1, 231, 235, 522, 524, 401, 428; 375/372; 710/52

(56) References Cited

U.S. PATENT DOCUMENTS

| | | | |
|---|---|---|---|
| 4,847,750 A | 7/1989 | Daniel | 364/200 |
| 5,163,136 A | 11/1992 | Richmond | 395/275 |
| 5,414,813 A | 5/1995 | Shiobara | 395/200 |
| 5,542,110 A | 7/1996 | Minagawa | 395/287 |
| 5,619,497 A | 4/1997 | Gallagher et al. | 370/394 |
| 5,673,416 A | 9/1997 | Chee et al. | 395/478 |
| 5,717,952 A | 2/1998 | Christiansen et al. | 395/842 |
| 5,818,468 A | 10/1998 | Le Cornec et al. | 345/521 |
| 5,903,283 A | 5/1999 | Selwan et al. | 345/521 |
| 5,956,748 A * | 9/1999 | New | 711/149 |
| 5,970,069 A | 10/1999 | Kumar et al. | 370/402 |
| 6,092,128 A * | 7/2000 | Maas et al. | 710/57 |
| 6,101,329 A * | 8/2000 | Graef | 710/52 |
| 6,105,086 A * | 8/2000 | Doolittle et al. | 710/52 |
| 6,226,338 B1 * | 5/2001 | Earnest | 375/372 |

OTHER PUBLICATIONS

"MU95C5480 LANCAM," *Music Semiconductors*, Rev. 0, pp. 1–12. (Jul. 22, 1994).
"Information technology—Telecommunications and information exchange between systems—High–level data link control (HDLC) procedures—Elements of procedures," *ISO/IEC 4335*, Fifth edition. (Dec. 15, 1993).
"Information technology—Telecommunications and information exchange between systems—High–level data link control (HDLC) procedures—Frame structure," *ISO/IEC 3309*, Fifth edition. (Dec. 15, 1993).
W. Simpson, Editor, Daydreamer, "PPP in HDLC–like Framing," pp. 1–25, (last modified Jul. 1994) <ftp://ds.internic.net/rfc>.

* cited by examiner

*Primary Examiner*—Chi Pham
*Assistant Examiner*—Alexander O. Boakye
(74) *Attorney, Agent, or Firm*—Westman, Champlin & Kelly

(57) ABSTRACT

A first-in-first-out ("FIFO") buffer is provided for buffering communication data. The FIFO buffer includes a write port having a data input, an end-of-frame input and a write control input, a read port having a data output, an end-of-frame output and a read control input, and a plurality of storage locations. A write end-of-frame counter is coupled to the write port and has a write count output, which increments as a function of the end-of-frame input and the write control input. A read end-of-frame counter is coupled to the read port and has a read count output, which increments as a function of the end-of-frame output and the read control input. A comparator has a first compare input coupled to the write count output, a second compare input coupled to the read count output and a compare output indicating whether there is a data frame stored in the plurality of storage locations.

16 Claims, 1 Drawing Sheet

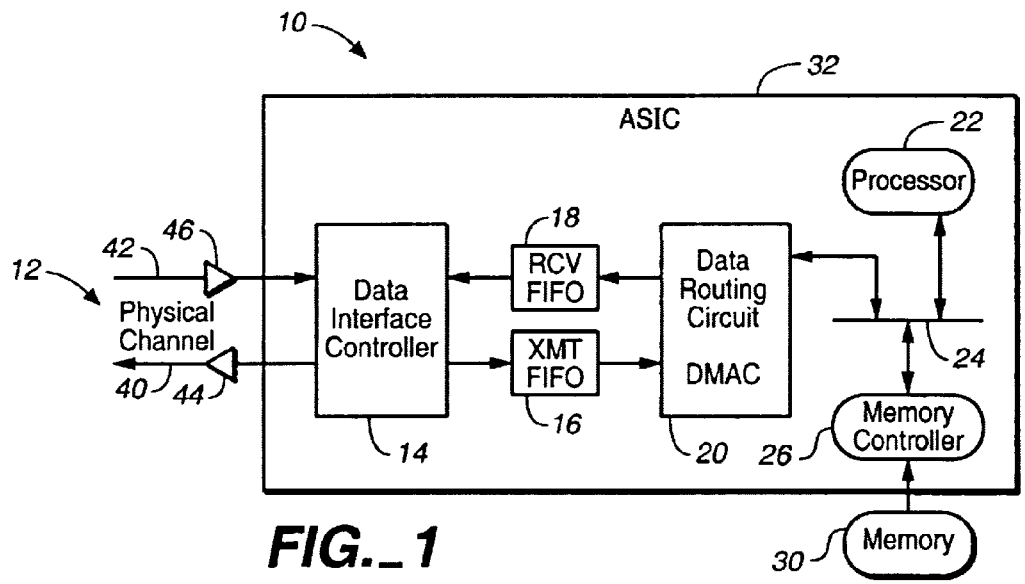
FIG._1
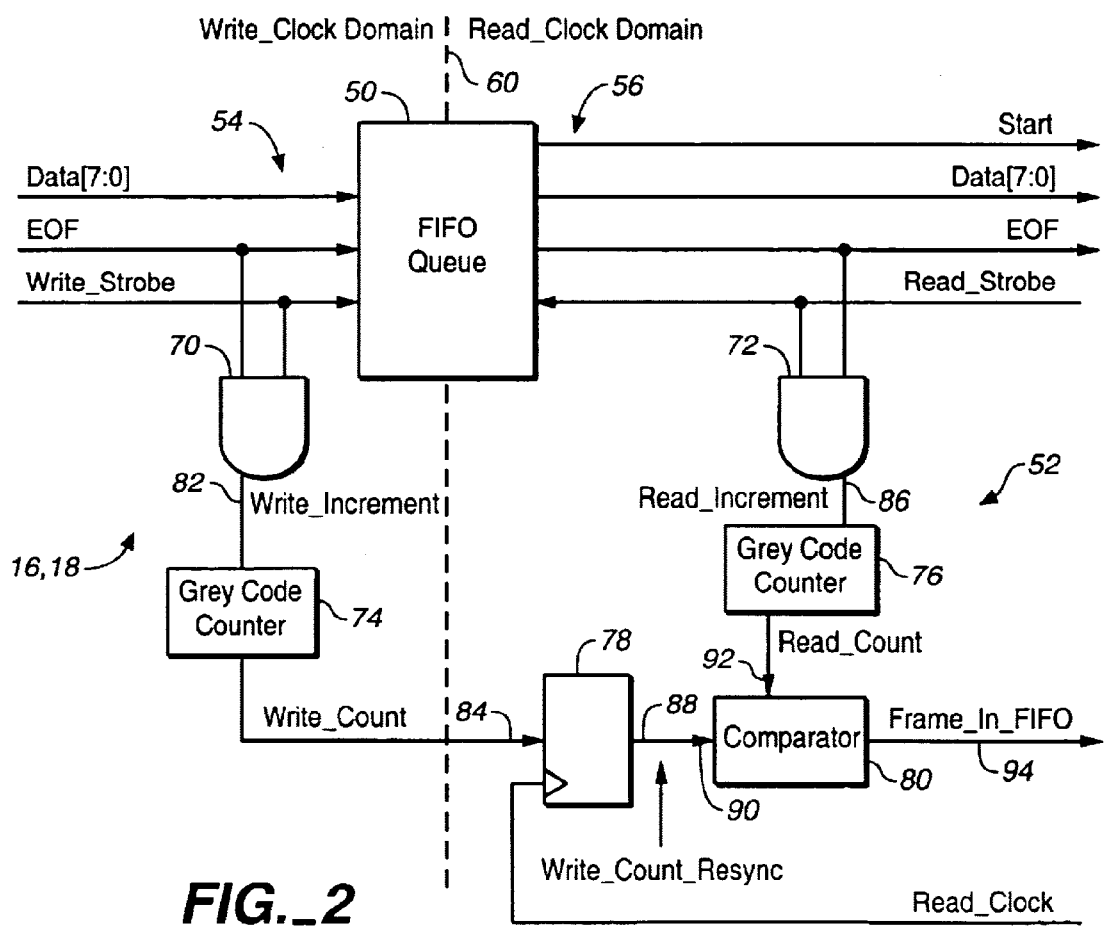
FIG._2

DATA COMMUNICATION CIRCUIT HAVING FIFO BUFFER WITH FRAME-IN-FIFO GENERATOR

CROSS-REFERENCE TO RELATED APPLICATIONS

Cross-reference is made to U.S. patent application Ser. No. 09/532,148, which is entitled "DATA TRANSMISSION BUFFER HAVING FRAME COUNTER FEEDBACK FOR RE-TRANSMITTING ABORTED DATA FRAMES" and was filed on even date herewith.

BACKGROUND OF THE INVENTION

The present invention relates to data communication circuits. More particularly, the present invention relates to a first-in-first-out (FIFO) buffer for buffering data frames in a data communication circuit.

Data communication circuits such as network devices and telecommunications circuits typically have several communication channels for connecting to multiple devices such as workstations, telephone and television systems, video teleconferencing systems and other facilities over common data links or carriers. A channel is a logical path from one source to one destination and can be unidirectional or bidirectional. A data routing circuit, such as a direct memory access (DMA) controller, routes data to and from each channel. The data is usually grouped into frames, or packets, of any size. Each channel includes a data interface controller, such as a serial wide area network (SWAN) controller or a local area network (LAN) controller that is coupled to the data routing circuit for controlling transmission of its respective data over the data link or carrier.

Data interface controllers are often configured to transmit frames or packets of data having an arbitrary length at a fixed speed. For example, a WAN controller may transmit an Internet Protocol (IP) packet over a fixed speed Interactive Services Digital Network (ISDN) Basic Rate Interface (BRI) using high level data link control (HDLC) framing. Alternatively, a LAN controller such as an Ethernet controller may transmit an IP packet over a fixed speed 10 or 100 Mbps LAN, for example.

In these applications, it is common to use a first-in-first-out (FIFO) memory for buffering transmit and receive data between the data routing circuit and data interface controller. Each communication channel typically has its own transmit FIFO and its own receive FIFO. A typical FIFO uses a dual port random access memory (RAM) for storing the data. One port is used by the data interface controller and the other port is used by the data routing circuit. During a transmit operation, the data routing circuit writes the data packets to one end of the FIFO at a data routing circuit transmission rate, and the data interface controller reads the packets at the other end of the FIFO at the rate of the fixed speed data interface.

The FIFO is needed, because the data routing circuit transmission rate is generally substantially higher on average than the rate of the fixed speed data interface. Also, the data routing circuit is subject to "gaps" in its ability to feed the FIFO because of memory access latencies, contention with other master devices that are coupled to the memory bus and control logic overhead.

Each FIFO is accompanied by control logic that requests service from the data routing circuit when the amount of data in the FIFO drops below a certain point, such as an "almost empty" threshold. This amount is chosen such that even with worst-case memory access latency, bus contention and control overhead, the data in the FIFO will not be completely drained by the fixed speed data interface.

The fixed speed data interface controller is typically configured to start extracting data from the FIFO only after a set amount of data is in the FIFO. This point is referred to as a "start" threshold. Once the data interface controller has started transmitting, it must continue transmitting until the end of the frame. If the data interface controller is allowed to extract data from the FIFO as soon as the first bit of data is stored in the FIFO from the data routing circuit, the FIFO will have very little tolerance for data routing circuit delays that may be occasioned by memory access latency, bus contention and control logic overhead. If the FIFO runs out of data before the entire data packet or frame has been transmitted, a FIFO under run occurs which corrupts the transmission. The amount of data that needs to be in the FIFO before the fixed speed data interface controller is allowed to begin extracting data from the FIFO is calculated to accommodate the worst-case data routing circuit delays.

Similarly, during a receive operation, the data interface controller writes the data packets at one end of the FIFO at the rate of the fixed speed data interface, and the data routing circuit reads the data packets from the other end of the FIFO at the data routing circuit transmission rate. The data routing circuit waits until there is a sufficient amount of data stored in the FIFO before reading a data packet from the FIFO. This allows the data routing circuit to read an entire packet or frame from the FIFO in a "burst mode" at the data routing circuit transfer rate. The amount of data that is required to be stored in the FIFO before the data routing circuit will start reading data from the FIFO is determined by a selected "start" threshold, similar to the transmit operation.

There are two difficulties that occur with the above-described transmit and receive operations. During a transmit operation, if the last data frame being sent by the data routing circuit is not large enough to trigger the start threshold, then the data interface controller may never read the data frame out of the FIFO. Likewise, during a receive operation, when the last data frame is received by the data interface controller and stored in the FIFO, the data routing circuit will read data out of the FIFO until the start threshold flag is de-asserted. The remainder of the data frame that is below the start threshold in the FIFO may be stuck in the FIFO.

In these situations, the transmit and receive devices therefore need some way of knowing that a data frame is in the FIFO waiting to be transmitted. For example, a "smart" data interface controller could be-used in which the transmitting device (i.e. the data interface controller) would monitor a FIFO-empty flag provided by the FIFO and would begin transmitting if the FIFO was not empty and a certain amount of time had passed. The amount of time that the data interface controller would, wait before beginning a transmission could be based on a predetermined relationship between the data routing circuit transmission rate and the fixed speed data interface rate among other factors. Similarly, during receive operations, the data routing circuit could just read data until the FIFO was empty. However, the ability of the data routing circuit to "burst" data frames from the FIFO may be compromised due to an unknown amount of data in the FIFO.

The FIFO buffer of the present invention addresses these and other problems and offers other advantages over the prior art.

SUMMARY OF THE INVENTION

One aspect of the present invention is directed to a first-in-first-out ("FIFO") buffer for buffering communication data. The FIFO buffer includes a write port having a data input, an end-of-frame input and a write control input, a read port having a data output, an end-of-frame output and a read control input, and a plurality of storage locations. A write end-of-frame counter is coupled to the write port and has a write count output, which increments as a function of the end-of-frame input and the write control input. A read end-of-frame counter is coupled to the read port and has a read count output, which increments as a function of the end-of-frame output and the read control input. A comparator has a first compare input coupled to the write count output, a second compare input coupled to the read count output and a compare output indicating whether there is a data frame stored in the plurality of storage locations.

Another aspect of the present invention is directed to a data communication circuit for buffering data, which is divided into multiple-bit data frames. The circuit includes a data routing circuit, a data interface, a transmit first-in-first-out ("FIFO") buffer and a receive FIFO buffer. Each buffer is operatively coupled between the data routing circuit and the data interface and includes a write port having a data input, an end-of-frame input and a write control input, a read port having a data output, an end-of-frame output and a read control input, and a plurality of storage locations. A write end-of-frame counter is coupled to the write port and has a write count output, which increments as a function of the end-of-frame input and the write control input. A read end-of-frame counter is coupled to the read port and has a read count output, which increments as a function of the end-of-frame output and the read control input. A comparator has a first compare input coupled to the write count output, a second compare input coupled to the read count output and a compare output indicating whether there is a data frame stored in the plurality of storage locations.

Yet another aspect of the present invention is directed to a method of buffering multiple-bit data frames in a data communication system, wherein each data frame has a beginning and an end. The method includes storing successive portions of successive ones of the data frames in a first-in-first-out (FIFO) buffer. Each successive portion includes an end-of-frame flag, which is asserted when the portion being stored includes the end that data frame. A grey-coded write count is incremented as each of the asserted end-of-frame flags is stored in the FIFO. The successive data frame portions are read from the FIFO buffer. A grey-coded read count is incremented as each of the data frame portions that have an asserted end-of-frame flag is read from the FIFO. The step of reading is controlled as a function of a comparison of the write count and the read count.

BRIEF DESCRIPTION OF THE DRAWINGS

FIG. 1 is a block diagram of a data communication circuit, according to one embodiment of the present invention.

FIG. 2 is a block diagram of a FIFO buffer used within the data communication circuit shown in FIG. 1, according to one embodiment of the present invention.

DETAILED DESCRIPTION OF THE PREFERRED EMBODIMENTS

FIG. 1 is a block diagram of a data communication circuit according-to one embodiment of the present invention. Data communication circuit 10 includes physical channel 12, data interface controller 14, transmit first-in-first-out (FIFO) buffer 16, receive FIFO buffer 18, data routing circuit 20, such as a direct memory access (DMA) controller, processor 22, system bus 24, memory controller 26 and memory 30. In one embodiment, data interface controller 14, transmit and receive FIFOs 16 and 18, DMA controller 20, processor 22, system bus 24 and memory controller 26 are all fabricated on a single semiconductor integrated circuit 32, such as an application specific integrated circuit (ASIC).

Physical channel 12 includes a transmit data link or carrier 40 and a receive data link or carrier 42, which are coupled to Physical Layer (PHY) devices 44 and 46, respectively, for interfacing with transmit and receive data links 40 and 42. In one embodiment, physical channel 12 includes an ISDN line or frame relay (T1/E1 or fractional T1/E1) line, for example.

Data interface controller 14 controls data communication between DMA controller 20 and physical channel 12 along one or more logical channels. Data interface controller 14 can include a WAN controller, for example, which transmits an Internet Protocol (IP) packet over a fixed speed interactive services digital network (ISDN) Basic Rate Interface (BRI) using high level data link control (HDLC) framing. Alternatively, data interface controller 14 can include a LAN controller, such as an Ethernet controller, which transmits an IP packet over a fixed speed 10 or 100 Mbps LAN, for example. Other protocols can also be used.

Data interface controller 14 is coupled to DMA controller 20 through transmit FIFO 16 and receive FIFO 18. Transmit FIFO 16 and receive FIFO 18 each include a random access memory (RAM) device for buffering data between data interface 14 and DMA controller 20. The memory locations within each RAM device are divided into blocks, or "queues", of any size with one queue being associated with a corresponding one of the logical channels. For simplicity, the following discussion will assume that transmit FIFO 16 and receive FIFO 18 each have a single logical channel. However, any number of logical channels can be used with the present invention. As discussed in more detail with respect to FIG. 2, transmit FIFO 16 and receive FIFO 18 each include a frame-in-FIFO detector for detecting whether a data frame is present in each FIFO. The outputs of the frame-in-FIFO detectors can be used by data interface controller 14 and DMA controller 20 to more efficiently transfer data frames into and out of the FIFOs.

DMA controller 20 is coupled to processor 22 and memory controller 26 over system bus 24. DMA controller 20 operates as a data routing circuit under the control of processor 22 and routes transmit data in multiple-bit data frames or packets from external memory 30 to the logical channel in transmit FIFO 16. DMA controller 20 also routes receive data from the logical channel in receive FIFO 18 to external memory 30, to another device coupled to system bus 24, or to the logical channel within transmit FIFO 18. DMA controller 20 transfers each data frame or packet a byte or word at a time at the DMA transfer rate until the entire data frame has been transferred. This operation is known as a "burst" transfer. A "burst" transfer is very efficient since DMA controller 20 has a very high transfer rate. DMA controller 20 notifies processor 22 only when the data transfer of the entire data frame is complete. Data routing circuits other than a DMA controller, such as a processor or a switch fabric device (such as an Ethernet switch) can also be used in alternative embodiments of the present invention.

Memory controller 26 is coupled between system bus 24 and external memory 30 for controlling data transfers to and from memory 30 by DMA controller 20 and processor 22. Memory controller 26 can be located on integrated circuit 32 or can be a separate module from integrated circuit 32.

During a transmit operation, processor 22 notifies DMA controller 20 that there is a data frame in memory 30 to be transferred through transmit FIFO 16. DMA controller 20 passes successive words or bytes of the data frame from memory 30, through memory controller 26 to successive storage locations within transmit FIFO 16. DMA controller 20 continues to pass each successive word or byte of the data frame until the entire data frame has been transmitted or transmit FIFO 16 is full, as indicated by an "almost full" status flag set by transmit FIFO 16.

When a sufficient amount of data is stored in transmit FIFO 16, data interface controller 14, transmit FIFO 16 asserts a "start" flag, which notifies data interface controller that it can begin retrieving the stored words or bytes at a constant rate, beginning with the first word or byte that was passed by DMA controller 20, until the entire data frame has been extracted from transmit FIFO 16. Data interface controller 14 adds any necessary header information such as address and control information to the data, frames the header and data according to the selected protocol and then transmits the framed header and data through physical channel 12.

Transmit FIFO 16 is needed because the rate that DMA controller 20 feeds transmit FIFO 16 is different on average than the fixed rate at which data interface controller 14 retrieves data from transmit FIFO 16. Also, DMA controller 20 is subject to "gaps" in its ability to feed transmit FIFO 16 because of access latencies of memory 30, contention on system bus 24 with other bus masters such as processor 22, service of other logical channels in transmit FIFO 16 and control logic overhead.

During a receive operation, a multiple-bit data frame is received by data interface controller 14 over physical channel 12. The data interface controller 14 receives the data frame and passes successive words or bytes of the data frame to successive storage locations within receive FIFO 18 until the entire data frame has been stored. When there is a sufficient amount of data within receive FIFO 18, DMA controller 20 begins retrieving the words or bytes from receive FIFO 18 and stores the words or bytes in memory 30 until the entire data frame has been extracted from receive FIFO 18. DMA controller 20 then notifies processor 22 that the data transfer is complete. Alternatively, DMA controller 20 may route the received data frame to another device coupled to system bus 24 or to transmit FIFO 16.

Processor 22 can include an on-chip Reduced Instruction Set (RISC™) processor, such a MIPS CW4011 MiniRISC™ Superscalar Processor Core available from LSI Logic Corporation. Alternatively, processor 22 can also include an off-chip processor, such as an i486 or i960 microprocessor manufactured by Intel Corporation. Other processors can also be used. Memory 30 can include a variety of memory types, such as a dynamic random access memory (DRAM), a static RAM or a flash memory, for example.

FIG. 2 is a block diagram of one of the transmit and receive FIFOs 16, 18 in greater detail. FIFO 16, 18 includes FIFO queue 50 and frame-in-FIFO detector 52. FIFO queue 50 has a write port 54 and a read port 56. Write port 54 includes a data input labeled DATA[7:0], an end-of-frame flag input labeled EOF, and a write control input labeled WRITE_STROBE. Read port 56 includes a start threshold flag output labeled START, a data output labeled DATA [7:0], an end-of-frame flag output labeled EOF, and a read control input labeled READ_STROBE. In one embodiment, FIFO queue 50 includes a dual-port RAM. In an alternative embodiment, a single-port RAM can be used with additional circuitry to multiplex the write and read ports 54 and 56.

FIFO 16, 18 can be synchronous or asynchronous. In the embodiment shown in FIG. 2, FIFO 16, 18 is asynchronous, which is the most common type of FIFO used in telecommunications applications. Dashed line 60 represents a dividing line between a first, WRITE_CLOCK domain and second, READ_CLOCK domain, which are asynchronous to one another. Write port 54 resides in the WRITE_CLOCK domain, while read port 56 resides in the READ_CLOCK domain.

In transmit FIFO 16, write port 54 would be coupled to DMA controller 20, which would operate the write port in the WRITE_CLOCK domain (i.e. at the DMA transfer rate). Read port 56 would be coupled to data interface controller 14, which would operate the read port in the READ_CLOCK domain (i.e. at the fixed speed data interface rate).

In receive FIFO 16, write port 54 would be coupled to data interface controller 14, which would operate the write port in the WRITE_CLOCK domain (i.e. at the fixed speed data interface rate). Read port 56 would be coupled to DMA controller 20, which would operate the read port in the READ_CLOCK domain (i.e. at the DMA transfer rate).

During a write operation, DMA controller 20, for example, writes each successive data frame to FIFO queue 50 one byte at a time. DMA controller 20 applies each byte to data input DATA[7:0] along with a corresponding EOF flag to the EOF input and pulses write control input WRITE_STROBE. FIFO queue 50 receives the write pulse and stores the data byte and corresponding EOF flag at a selected address. The control circuitry within FIFO queue 50 maintains a write pointer (not shown) which points to a current address within the FIFO at which the word or byte will be stored. FIFO queue 50 increments the address of the write pointer after each word or byte is written into the FIFO. When the last word or byte of a data frame is being written to FIFO queue 50, DMA controller 20 asserts the corresponding EOF flag.

When enough data has been stored in FIFO queue 50 to initiate a transmit operation, FIFO queue 50 asserts start threshold flag START, which notifies data interface controller 14, for example, that it can start transmitting data from FIFO queue 50. Data interface controller 14 reads each subsequent word or byte that is stored in FIFO queue 50 at a fixed rate by providing a series of read pulses on read control input READ_STROBE. The control circuitry within FIFO queue 50 maintains a read pointer (also not shown), which is incremented with each read pulse received on read control input READ_STROBE. As Leach read pulse is received on read control input READ_STROBE, FIFO queue 50 provides the word or byte of the data frame and its corresponding EOF flag that are stored in the address referenced by the current read pointer to data output DATA [7:0] and end-of-frame output EOF. The EOF flag is set when the last word or byte of the data frame is being read from FIFO queue 50.

In some embodiments, the control circuitry within FIFO queue 50 maintains additional status flags, which reflect the amount of data stored within the FIFO. For example, these status flags can include an "almost empty" flag and an "almost full" flag. The almost empty flag would have an active state when the number of words or bytes stored in FIFO queue 50 is less than a selected threshold. The almost full flag would indicate whether FIFO queue 50 is almost full of data.

Frame-in-FIFO detector 52 detects whether the end of at least one data frame is stored in FIFO queue 50 by monitoring the signals supplied to write port 54 and read port 56. This information can then be used by the transmitting and receiving devices to ensure efficient buffering through FIFO queue 50. Frame-in-FIFO detector includes logic AND gates 70 and 72, grey code counters 74 and 76, re-synchronizing circuit 78 and comparator 80. AND gate 70 has first and second inputs, which are coupled to the EOF flag input and the WRITE_STROBE input, respectively, and a has a WRITE_INCREMENT output, which is coupled to an increment control input 82 of grey code counter 74. Grey code counter 74 has a WRITE_COUNT output, which is coupled to a data input 84 of re-synchronizing circuit 78.

Whenever the last byte of a data frame is being written in to FIFO queue 50, the EOF flag is asserted while the WRITE_STROBE input is pulsed. This causes the WRITE_INCREMENT output of AND gate 70 to go high. Each time the WRITE_INCREMENT output goes high, grey code counter 74 increments the WRITE_COUNT output according to a grey code in which only one bit of the WRITE_COUNT output is changed with each increment of the counter. Thus, WRITE_COUNT indicates the number of data frames that have been written to FIFO queue 50. As described in more detail below, the grey-coded WRITE_COUNT output limits re-synchronizing errors when the output is re-synchronized to the READ_CLOCK domain.

Similar to AND gate 70, AND gate 72 has first and second inputs, which are coupled to the EOF flag input and the READ_STROBE input, respectively, and has a READ_INCREMENT output, which is coupled to an increment control input 86 of grey code counter 76. Grey code counter 76 has a READ_COUNT output, which increments according to a grey code each time the READ_INCREMENT output goes high. The READ_INCREMENT output goes high as the last byte of a data frame is read out of FIFO queue 50, when the EOF flag output and the READ_STROBE input are both high. Thus, READ_COUNT indicates the number of data frames read out of FIFO queue 50.

Before the number of data frames that were written to FIFO queue 50 can be compared to the number of data frames that were read from the queue, re-sync circuit 78 synchronizes the WRITE_COUNT output to the READ_CLOCK domain. In one embodiment, re-sync circuit 78 includes a flip-flop having a data input 84, which is coupled to the WRITE_COUNT output, a WRITE_COUNT_RESYNC output 88, and a clock input 92, which is coupled to READ_CLOCK. READ_CLOCK is a clock signal that is synchronous with the READ_CLOCK domain. Any type of re-synchronizing circuit can be used with the present invention.

Comparator 80 has a first operand input 90 coupled to the WRITE_COUNT_RESYNC output 88, a second operand input 92 coupled to the READ_COUNT output and a FRAME-IN-FIFO output 94. Comparator 80 compares the number of data frames written into FIFO queue 50, as indicated by WRITE_COUNT_RESYNC, with the number of data frames read from FIFO queue 50, as indicated by READ_COUNT, and generates a compare output on FRAME_IN_FIFO output 94. FRAME_IN_FIFO output 94 indicates whether at least one data frame is in FIFO queue 50.

In one embodiment, comparator 80 includes an exclusive-OR circuit, which performs a logical exclusive-OR operation between the WRITE_COUNT_RESYNC output and the READ_COUNT output and applies the result to FRAME_IN_FIFO output 94. If the write count and the read count are different from one another, FRAME_IN_FIFO output 94 will be active, indicating that at least one data frame is stored in FIFO queue 50. If the write count and the read count are the same, then all data frames that were written in FIFO queue 50 have already been read out of FIFO queue 50, and FRAME_IN_FIFO output 94 will be inactive.

In an alternative embodiment, comparator 80 includes a subtractor circuit, having an addend input forming operand input 90, a subtrahend input forming operand input 80, and a result output forming FRAME_IN_FIFO output 94. In this embodiment, comparator 80 would subtract READ_COUNT from WRITE_COUNT_RESYNC such that FRAME_IN_FIFO output 94 would indicate the number of data frames remaining in FIFO queue 50. Other types of compare circuits can also be used, depending on what information is needed at the output.

The FRAME_IN_FIFO output can be used by the reading device (either data interface controller 14 or DMA controller 20) to ensure that all data frames are read from FIFO queue 50 efficiently. For example, during a transmit operation, if the data frame being written to FIFO queue 50 is not large enough to trigger the START threshold flag, and the data frame is the last data frame being sent by DMA controller 20, data interface controller 14 can monitor the FRAME_IN_FIFO output to determine whether there are any remaining data frames in FIFO queue 50 that can be transmitted. If the FRAME_IN_FIFO output is asserted (or-non-zero), then data interface controller 14 can begin transmitting another data frame from FIFO queue 50 (even if the START flag is not asserted).

Similarly, during a receive operation, when the last data frame is being received by DMA controller 20, the amount of data stored in FIFO queue 50 will drop below the start threshold level and the START threshold flag will be deasserted. To prevent the remainder of the data from being stuck in FIFO queue 50, DMA controller 20 can monitor the FRAME_IN_FIFO output to determine whether the end of a frame is stored in FIFO queue 50. If so, DMA controller 20 can continue to read successive bytes or words from data output DATA[7:0] in the "burst" mode until the last byte of the frame is read (even if the START flag is not asserted). This maintains the ability of DMA controller 20 to burst data frames from FIFO queue 50 at a maximum DMA transfer rate.

As mentioned above, the use of grey code counters assists end-of-frame detector 52 in re-synchronizing the write count to the read clock domain. Since the WRITE_COUNT output is asynchronous to the READ_CLOCK, it is possible that the WRITE_COUNT output could be changing while re-sync circuit 78 latches data input 84. This can cause errors in the WRITE_COUNT_RESYNC output 88. If a normal binary code were used by counters 74 and 76, it would be possible for several bits in WRITE_COUNT to change at the same time with each increment of the count. Thus, a latching error could produce a vastly different count on WRITE_COUNT_RESYNC output 88 than the actual count on the WRITE_COUNT output. With the use of grey code counters, only a single bit of the WRITE_COUNT output changes with each count increment. A re-synchronizing error would therefore produce a WRITE_COUNT_RESYNC output that is only one count off of the actual write count.

In the prior art, the standard practice would be to re-sync the WRITE_INCREMENT signal to the READ_CLOCK domain and use one counter to keep track of the number of frames in FIFO queue 50. This "standard" method has the above re-sync problems and also has clock dependency problems (where one clock might be required to be faster than the other clock). These problems go away with the use of two grey code counters, with each counter residing in one of the clock domains. The present invention allows any ratio of read to write clock frequency.

The data communication circuit and FIFO buffer of the present invention have a simplified design, which is easy for Logic designers to understand. This allows the buffer to be used easily in a variety of applications. The read and write clocks on either side of the FIFO buffer can be operated at any speed irrespective of the other clock. Other buffer schemes of the prior art can have clock dependency limitations.

Although the present invent-on has been described with reference to preferred embodiments, workers skilled in the art will recognize that changes may be made in form and detail without departing from the spirit and scope of the invention. For example, the FIFO buffer and the grey-code counters can be any size. The comparator can be located in the read clock domain or in the write clock domain. The present invention can be implemented as an asynchronous or a synchronous FIFO buffer. For a synchronous FIFO buffer, the grey-coding and re-syncing would not be necessary. Other modifications can also be made. The term "coupled" used in the specification and the claims can include a variety of connections, such as a direct connection or a connection through one or more intermediate elements.

What is claimed is:

1. A first-in-first-out ("FIFO") buffer for buffering communication data, which is divided into multiple-bit data frames, the FIFO buffer comprising:
    a write port comprising a data input, an end-of-frame input and a write control input;
    a read port comprising a data output, an end-of-frame output and a read control input;
    a plurality of storage locations;
    a write end-of-frame counter coupled to the write port and having a write count output, which increments according to a Grey Code as a function of the end-of-frame input and the write control input;
    a read end-of-frame counter coupled to the read port and having a read count output, which increments according to a Grey Code as a function of the end-of-frame output and the read control input; and
    a comparator having a first compare input coupled to the write count output, a second compare input coupled to the read count output and a compare output indicating whether there is a data frame stored in the plurality of storage locations.

2. The FIFO buffer of claim 1 and further comprising:
    a first logical AND circuit having a first input coupled to the end-of-frame input, a second input coupled to the write control input and an output coupled to an increment control input of the write end-of-frame counter; and
    a second logical AND circuit having a first input coupled to the end-of-frame output, a second input coupled to the read control input and an output coupled to an increment control input of the read end-of-frame counter.

3. The FIFO buffer of claim 1 wherein the write port is asynchronous to the read port.

4. The FIFO buffer of claim 3 and further comprising:
    a resynchronizing circuit, which is coupled between a respective one of the write and read count outputs and a respective one of the first and second compare inputs and is adapted to synchronize the respective one of the write and read count outputs with a clock signal.

5. The FIFO buffer of claim 1 wherein the write port is synchronous with the read port.

6. The FIFO buffer of claim 1 wherein the comparator comprises a logical exclusive-OR circuit having a first operand input forming the first compare input, a second operand input forming the second compare input and a result output forming the compare output, which represents whether the first and second operand inputs are equivalent to one another.

7. The FIFO buffer of claim 1 wherein the comparator comprises a subtractor having an subtrahend input forming the first compare input, an addend input forming the second compare input and a result output forming the compare output, which represents a difference between the first and second compare inputs.

8. A data communication circuit for buffering data, which is divided into multiple-bit data frames, the circuit comprising:
    a data routing circuit;
    a data interface; and
    a transmit first-in-first-out ("FIFO") buffer and a receive FIFO buffer, wherein each buffer is operatively coupled between the data routing circuit and the data interface and comprises:
        a write port comprising a data input, an end-of-frame input and a write control input;
        a read port comprising a data output, an end-of-frame output and a read control input;
        a plurality of storage locations for storing data bits received on the data input;
        a write end-of-frame counter coupled to the write port and having a write count output, which increments according to a Grey Code as a function of the end-of-frame input and the write control input;
        a read end-of-frame counter coupled to the read port and having a read count output, which increments according to a Grey Code as a function of the end-of-frame output and the read control input; and
        a comparator having first compare input coupled to the write count output, a second compare input coupled to the read count output and a compare output indicating whether there is a data frame stored in the plurality of storage locations.

9. The data communication circuit of claim 8 wherein the FIFO buffer further comprises:
    a first logical AND circuit having a first input coupled to the end-of-frame input, a second input coupled to the write control input and an output coupled to an increment control input of the write end-of-frame counter; and
    a second logical AND circuit having a first input coupled to the end-of-frame output, a second input coupled to the read control input and an output coupled to an increment control input of the read end-of-frame counter.

10. The data communication circuit of claim 8 wherein the data interface, the write port of the receive FIFO buffer and the read port of the transmit FIFO buffer are in a first clock domain and the data routing circuit, the read port of the receive FIFO and the write port of the transmit FIFO are in a second clock domain, which is asynchronous to the first clock domain.

11. The data communication circuit of claim 10 wherein the transmit and receive FIFO buffers each further comprise:

a resynchronizing circuit, which is coupled between the write count output and the first compare input and is adapted to synchronize the write read count output with the second clock domain.

12. The data communication circuit of claim 8 wherein the data interface, the write port of the receive FIFO buffer and the read port of the transmit FIFO buffer are synchronous with the data routing circuit, the read port of the receive FIFO and the write port of the transmit FIFO.

13. The data communication circuit of claim 8 wherein the comparator comprises a logical exclusive-OR circuit having a first operand input forming the first compare input, a second operand input forming the second compare input and a result output forming the compare output, which represents whether the first and second operand inputs are equivalent to one another.

14. The data communication circuit of claim 8 wherein the comparator comprises a subtractor having an subtrahend input forming the first compare input, an addend input forming the second compare input and a result output forming the compare output, which represents a difference between the first and second compare inputs.

15. A method of buffering multiple-bit data frames in a data communication system, wherein each data frame has a beginning and an end, the method comprising:

storing successive portions of successive ones of the data frames in a first-in-first-out (FIFO) buffer, wherein each successive portion includes an end-of-frame flag, which is asserted when the portion being stored includes the end of that data frame;

incrementing a grey-coded write count as each of the asserted end-of-frame flags is stored in the FIFO;

reading the successive data frame portions from the FIFO buffer;

incrementing a grey-coded read count as each of the data frame portions that have an asserted end-of-frame flag is read from the FIFO; and controlling the step of reading as a function of a comparison of the write count and the read count.

16. The method of claim 15 wherein: the step of storing is performed in a first clock domain; the step of reading is performed in a second clock domain, which is asynchronous to the first clock domain; and the method further comprises synchronizing the write count and the read count to one of the first and second clock domains and then comparing the write count to the read count to form the comparison.

* * * * *